US010303990B1

(12) United States Patent
Ishii

(10) Patent No.: US 10,303,990 B1
(45) Date of Patent: May 28, 2019

(54) INFORMATION GENERATING DEVICE, PRINT PROCESSING DEVICE, AND INFORMATION GENERATING METHOD INCLUDING SETTING A MAGNIFICATION RATIO

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Mitsunori Ishii, Tokyo (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 15/914,386

(22) Filed: Mar. 7, 2018

(51) Int. Cl.
*G06F 3/12* (2006.01)
*G06K 15/02* (2006.01)
*B41J 11/00* (2006.01)
*B65H 37/04* (2006.01)
*G06K 15/00* (2006.01)

(52) U.S. Cl.
CPC ......... *G06K 15/1868* (2013.01); *B41J 11/008* (2013.01); *B41J 11/009* (2013.01); *B65H 37/04* (2013.01); *G06K 15/1843* (2013.01); *G06K 15/404* (2013.01)

(58) Field of Classification Search
None
See application file for complete search history.

(56) References Cited

U.S. PATENT DOCUMENTS

2011/0216330 A1* 9/2011 Mitani .................. G06F 3/1205
358/1.2
2018/0129155 A1* 5/2018 Ogawa ............... G03G 15/5095

OTHER PUBLICATIONS

U.S. Appl. No. 15/711,035, filed Sep. 21, 2017, Ishii, M.

* cited by examiner

*Primary Examiner* — Andrew H Lam
(74) *Attorney, Agent, or Firm* — Foley & Lardner LLP

(57) ABSTRACT

An information generating device generates data for use in a print processing device capable of printing in a state where sheets are connected to each other, and includes a memory, an input device, and a controller. The memory stores predetermined image data. The input device receives sheet information relating to the sheets which are to be connected to each other by a sheet print processor. The controller sets a magnification ratio indicating either an enlargement ratio or a reduction ratio of the image data, based on a length of the sheet in a second direction orthogonal to a first direction in which sheets are to be connected. In addition, the controller determines a connection length indicating a length of a connection region which is formed between sheets in the first direction, based on the set magnification ratio and the lengths of sheets in the first direction.

19 Claims, 18 Drawing Sheets

| | LEFT END PORTION SHEET | | | CENTRAL SHEET | | | RIGHT END PORTION SHEET | | |
|---|---|---|---|---|---|---|---|---|---|
| H11 | FOLD-BACK | PRINT SURFACE | OVERLAPPING | FOLD-BACK | PRINT SURFACE | OVERLAPPING | FOLD-BACK | PRINT SURFACE | OVERLAPPING |
| | 0 | 400 | 20 | 20 | 380 | 20 | 20 | 400 | 0 |

⬇

| | LEFT END PORTION SHEET | | | CENTRAL SHEET | | | RIGHT END PORTION SHEET | | |
|---|---|---|---|---|---|---|---|---|---|
| H12 | FOLD-BACK | PRINT SURFACE | OVERLAPPING | FOLD-BACK | PRINT SURFACE | OVERLAPPING | FOLD-BACK | PRINT SURFACE | OVERLAPPING |
| | 0 | 395 | 25 | 25 | 370 | 25 | 25 | 395 | 0 |

| LEFT END PORTION SHEET | | | CENTRAL SHEET | | | RIGHT END PORTION SHEET | | |
|---|---|---|---|---|---|---|---|---|
| FOLD-BACK | PRINT SURFACE | OVERLAPPING | FOLD-BACK | PRINT SURFACE | OVERLAPPING | FOLD-BACK | PRINT SURFACE | OVERLAPPING |
| 0 | 400 | 20 | 20 | 380 | 20 | 20 | 400 | 0 |

⇩

H22

| LEFT END PORTION SHEET | | | CENTRAL SHEET | | | RIGHT END PORTION SHEET | | |
|---|---|---|---|---|---|---|---|---|
| FOLD-BACK | PRINT SURFACE | OVERLAPPING | FOLD-BACK | PRINT SURFACE | OVERLAPPING | FOLD-BACK | PRINT SURFACE | OVERLAPPING |
| 0 | 410 | 10 | 10 | 380 | 30 | 30 | 390 | 0 |

| FIRST SHEET | | | SECOND SHEET | | | THIRD SHEET | | |
|---|---|---|---|---|---|---|---|---|
| FOLD-BACK | PRINT SURFACE | OVERLAPPING | FOLD-BACK | PRINT SURFACE | OVERLAPPING | FOLD-BACK | PRINT SURFACE | OVERLAPPING |
| 0 | 400 | 20 | 20 | 380 | 20 | 20 | 400 | 0 |

⇩

H23

| FIRST SHEET | | | SECOND SHEET | | | THIRD SHEET | | | FOURTH SHEET | | |
|---|---|---|---|---|---|---|---|---|---|---|---|
| FOLD-BACK | PRINT SURFACE | OVERLAPPING | FOLD-BACK | PRINT SURFACE | OVERLAPPING | FOLD-BACK | PRINT SURFACE | OVERLAPPING | FOLD-BACK | PRINT SURFACE | OVERLAPPING |
| 0 | 360 | 60 | 60 | 300 | 60 | 60 | 300 | 60 | 60 | 360 | 0 |

INFORMATION GENERATING DEVICE, PRINT PROCESSING DEVICE, AND INFORMATION GENERATING METHOD INCLUDING SETTING A MAGNIFICATION RATIO

FIELD

Embodiments described herein relate generally to an information generating device, a print processing device, and an information generating method.

BACKGROUND

In the related art, there is a known print processing device that binds a plurality of sheets of paper using a sheet binding mechanism to print out in a connected state.

However, the print processing device uses paper of a standard size for paper to be connected, and thus, there is a case where a size of paper which fits a size of image data to be printed cannot be obtained. If an appropriate paper size according to image data is not obtained, there is a problem that a large margin is generated on the paper.

DESCRIPTION OF THE DRAWINGS

FIG. 14 is a diagram illustrating connection lengths of respective print images.

FIG. 18 is a diagram illustrating connection lengths of respective print images illustrated in FIG. 17.

DETAILED DESCRIPTION

An information generating device according to an embodiment generates data for use in a print processing device capable of printing out in a state where a plurality of sheets are connected to each other, and includes a memory, an input device, and a control unit. The memory stores predetermined image data. The input device receives sheet information on the plurality of sheets which are to be connected to each other by a sheet print processing device. The control unit sets a magnification ratio indicating either an enlargement ratio or a reduction ratio of the image data, based on a length of the sheet in a second direction orthogonal to a first direction in which the plurality of sheets specified by the sheet information are to be connected. In addition, the control unit determines a connection length indicating a length of a connection region which is formed between the plurality of sheets in the first direction based on the set magnification ratio and the lengths of the plurality of sheets in the first direction.

Hereinafter, the information generating device according to at least one embodiment will be described with reference to the drawings.

Figure 1:
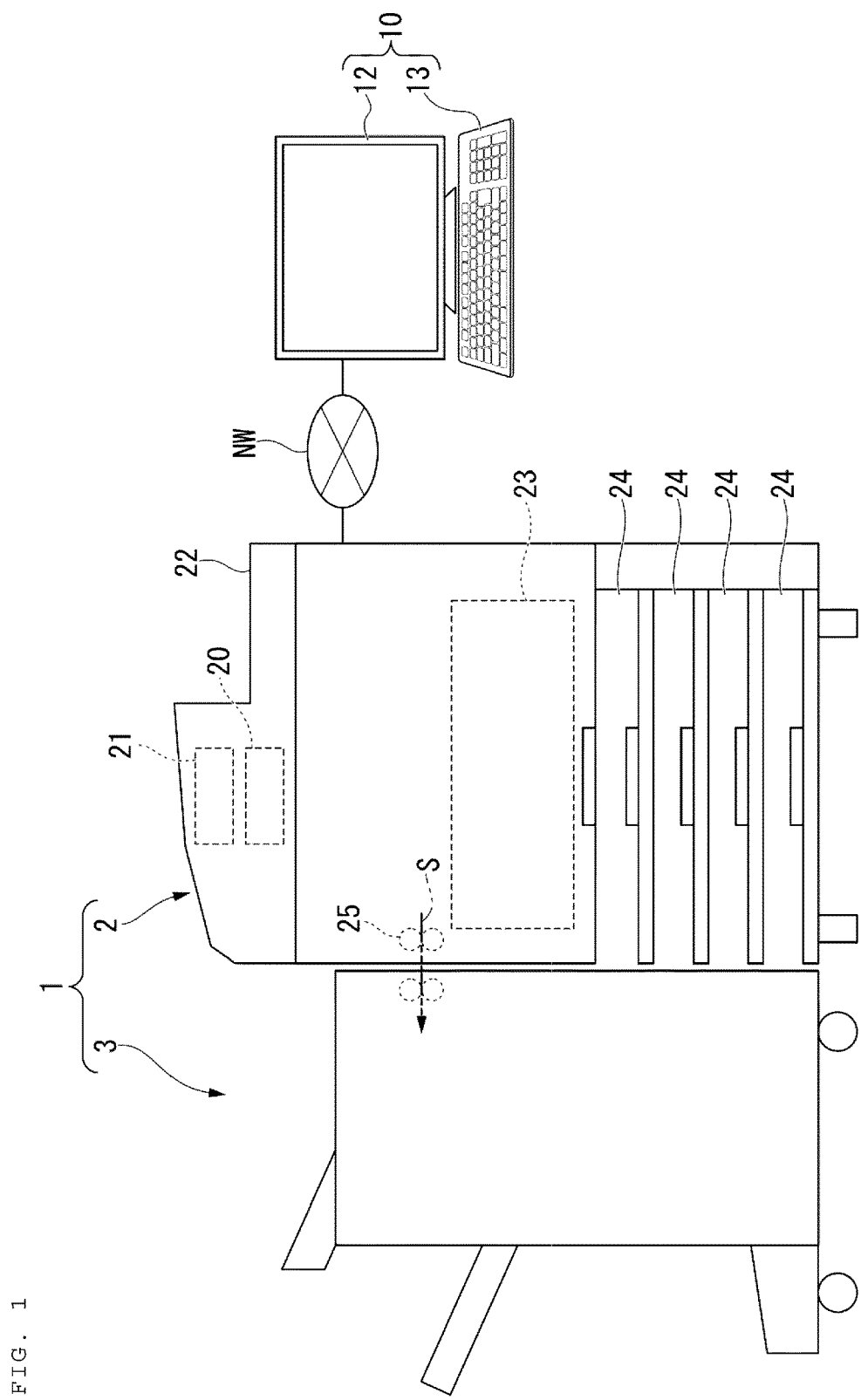
FIG. 1 is an external configuration view illustrating an example of an image forming system according to an embodiment.

FIG. 1 is an external configuration view illustrating an example of an image forming system 1 according to at least one embodiment. In the present embodiment, the image forming system 1 includes a print processing device (a print processor) 2, a post-processing device (a sheet post-processor) 3, and an information generating device 10. The information generating device 10 is, for example, a terminal such as a personal computer. A display device 12 such as a liquid crystal display and an input device (an input peripheral or input mechanism) 13 such as a mouse and a keyboard are connected to the information generating device 10. The information generating device 10 transmits image information and the like to the print processing device 2 via a network NW. In addition, the information generating device 10 transmits information (hereinafter, referred to as post-processing information) on the type of post-processing to the print processing device 2 (post-processing device 3) via the network NW.

The print processing device 2 forms an image on a recording medium (hereinafter, referred to as "sheet S") of a sheet shape such as paper. For example, the print processing device 2 may include multi-function peripherals (MFP) such as a multifunction printer, a printer, a copy machine, or the like. The post-processing device 3 performs post-processing on a sheet S transported from the print processing device 2. The sheet S is not limited to paper, and includes a plastic sheet such as an overhead projector (OHP) sheet.

The print processing device 2 includes a control unit (a controller) 20, a control panel 21, a scanner unit 22, a print unit 23, a paper feeding unit 24, a paper discharge unit 25, and a communication unit 26 (not illustrated).

The control panel 21 includes various keys or a touch panel that a user operates.

The scanner unit 22 includes a reading unit that reads image information of an object of which an image is to be captured. The scanner unit 22 sends the read image information to the print unit 23.

The print unit 23 forms an output image (hereinafter, referred to as a "toner image") using a developer such as toner, based on image information transmitted from the scanner unit 22 or an external device. The print unit 23 transfers the toner image onto a surface of the sheet S. The print unit 23 applies heat and pressure to the toner image transferred to the sheet S to fix the toner image on the sheet S.

The paper feeding unit 24 supplies the sheets S to the print unit 23 one by one in accordance with timing at which the print unit 23 forms the toner image.

The paper discharge unit 25 transports the sheet S discharged from the print unit 23 to the post-processing device 3.

The communication unit 26 receives information from the information generating device 10 and supplies the information to the control unit 20. In addition, the communication unit 26 transmits the information generated by the control unit 20 to the information generating device 10.

The control unit 20 controls an overall operation of the print processing device 2. That is, the control unit 20 controls the control panel 21, the scanner unit 22, the print unit 23, the paper feeding unit 24, and the paper discharge unit 25. The control unit 20 is configured with a control circuit including a central processing unit (CPU), a read only memory (ROM), and a random access memory (RAM). Details of the processing of the control unit 20 are described below.

Next, the post-processing device 3 according to at least one embodiment is described. The post-processing device 3 may be a sheet print processor that is adjacently disposed to, for example, the print processing device 2. The sheet S is transported from the print processing device 2 to the post-processing device 3. The post-processing device 3 performs post-processing on the transported sheet S. The post-processing device 3 performs, for example, stapling. The stapling is processing of binding the sheet S using a stapler. In the stapling, for example, the sheet S may be bound by a stapler (e.g., for metal needle staples), or the sheets S may be temporarily fixed by processing the sheets into a teeth shape using pressure.

The post-processing device 3 performs, for example, stapling of the standard sheet S discharged from the paper discharge unit 25 of the print processing device 2, and performs post-processing of connecting a plurality of sheets S. The sheet S of a standard size is, for example, a sheet S of A3 size or A4 size. The post-processing device 3 performs post-processing of connecting a plurality of sheets S, and discharges the connected sheets S as long paper. In the following description, a certain sheet S in paper discharged from the paper discharge unit 25 of the print processing device 2 is referred to as a first sheet S1. In addition, in the paper discharged from the paper discharge unit 25 of the print processing device 2, paper discharged after the first sheet S1 is referred to as a second sheet S2. In addition, when the first sheet S1 and the second sheet S2 are not distinguished from each other, the sheets are collectively described as sheets S.

In the present embodiment, the post-processing device 3 connects a plurality of the sheets S by two methods of saddle stitching stapling and bundle binding stapling, as an exemplary implementation of a binding mechanism or binder. The post-processing device 3 may have a configuration having both functions of the saddle stitching stapling and the bundle binding stapling, or may have a configuration having either one of them. Here, the saddle stitching stapling and the bundle binding stapling will be described with reference to FIG. 2, and FIG. 3. Details of the saddle stitching stapling and bundle binding stapling are described in, for example, application Ser. No. 15/711,035, entitled "INFORMATION GENERATING DEVICE, IMAGE FORMING APPARATUS, AND INFORMATION GENERATING METHOD," and filed on Sep. 21, 2017, which is incorporated herein by reference in its entirety for the techniques, systems and methods disclosed therein.

Figure 2:
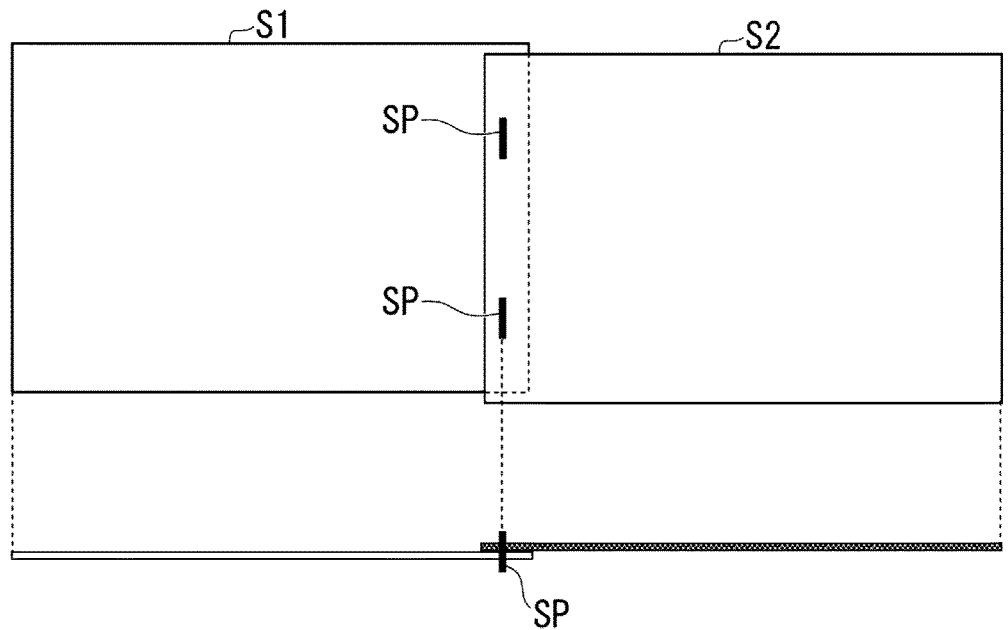
FIG. 2 is a view illustrating an example of sheets connected to each other by saddle stitching stapling.

FIG. 2 is a view illustrating an example of the sheet S connected by the saddle stitching stapling. The saddle stitching stapling is processing of disposing the sheet at a location where a staple is visible from a surface of the connected sheet S on which a toner image is formed. As illustrated in FIG. 2, the location where the staple SP is stapled is a location where an end portion of the first sheet S1 overlaps an end portion of the second sheet S2. The sheet S connected by the saddle stitching stapling is disposed at a location where a staple is visible from a surface on which a toner image is formed.

Figure 3:
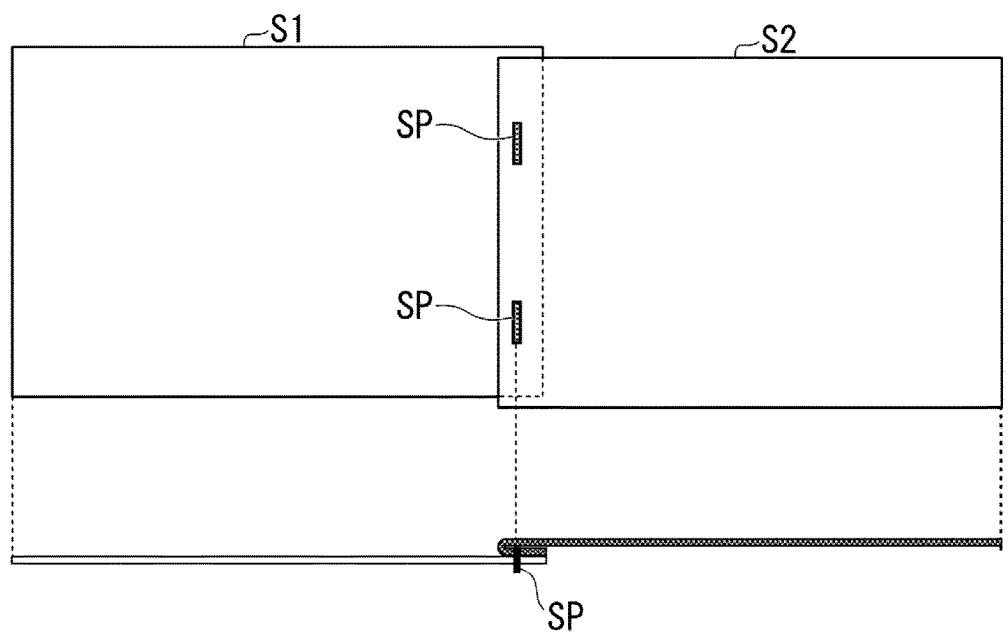
FIG. 3 is a view illustrating an example of sheets connected by bundle binding stapling.

FIG. 3 is a view illustrating an example of the sheet S connected by the bundle binding staple. The bundle binding stapling is post-processing of disposing the sheet at a location where a staple is not visible from the surface on which the toner image of the connected sheet S is formed. In the bundle binding stapling, the sheets S are bound together by the staple SP in a state where end portions are aligned. In this manner, the post-processing device allows for a binding mechanism (a binder) to carry out binding, as described above. In addition, in the bundle binding stapling, when two sheets S are connected to each other, a fold is formed in the sheet S that is discharged later. Here, the sheet S in which no fold is formed is overlapped with the sheet S in which the fold is formed from an end portion of the sheet S to the location of the fold of the sheet S in which the fold is formed.

As illustrated in FIG. 3, the location where the staple SP is stapled is a location where the end portion of the first sheet S1 overlaps the end portion of the second sheet S2. The second sheet S2 connected by the bundle binding stapling is folded back at an end portion connected by the staple SP. Thereby, the sheet S connected by the bundle binding stapling is disposed at a location where the staple is not visible from the surface on which the toner image is formed.

A connection region formed on the sheet S connected by the saddle stitching stapling or the bundle binding stapling will be described with reference to FIG. 4.

Figure 4:
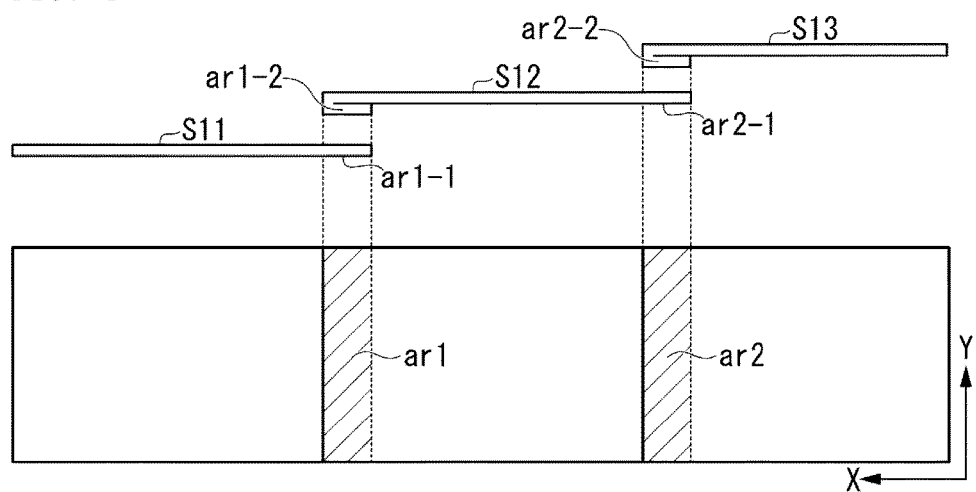
FIG. 4 is a view schematically illustrating an example of connection regions formed when a plurality of sheets are connected.

FIG. 4 is a view schematically illustrating an example of the connection region formed when a plurality of sheets S are connected. FIG. 4 illustrates the connection region when the plurality of sheets S are connected by the bundle binding stapling (FIG. 3).

FIG. 4 illustrates a case where three sheets S (a left end portion sheet S11, a central sheet S12, and a right end portion sheet S13) are connected. In the example illustrated in FIG. 4, a toner image is formed on each sheet S in a lateral direction (X direction), and each sheet S is connected in the lateral direction. The left end portion sheet S11 is the sheet S which is discharged first among the connected sheets S. The right end portion sheet S13 is the sheet S which is discharged last among the connected sheets S. The central sheet S12 is the sheet S disposed at the location of the left end portion sheet S11 and at timing other than the timing when the right end portion sheet S13 is discharged.

Connection regions ar1 and ar2 illustrated by oblique lines in FIG. 4 are regions formed between a plurality of sheets to be connected. In addition, the connection regions ar1 and ar2 are regions overlapping other sheets S. Hereinafter, when the connection regions ar1 and ar2 are not distinguished, the connection regions are collectively referred to as connection regions ar. Each of the connection regions ar has an overlapping region and a fold region. The overlapping region and the fold-back region configuring one connection region ar may have the same size, in at least one embodiment.

Specifically, the connection region ar1 is a region where the left end portion sheet S11 overlaps the central sheet S12 overlap. The connection region ar1 includes an overlapping region ar1-1 and a fold-back region ar1-2. The overlapping region ar1-1 is a region of the left end portion sheet S11 and overlaps the central sheet S12. The fold-back region ar1-2 is a region of the central sheet S12 and is a region from the left end portion of the central sheet S12 to a location where folds are formed.

The connection region ar2 is a region where the central sheet S12 overlaps the right end portion sheet S13. The connection region ar2 includes an overlapping region ar2-1 and a fold-back region ar2-2. The overlapping region ar2-1 is a region of the central sheet S12 and overlaps the right end portion sheet S13. The fold-back region ar2-2 is a region from the left end portion of the right end portion sheet S13 to a location where folds are formed.

When the saddle stitching stapling is performed, the sheets S are overlapped without folding. Accordingly, each of the connection regions ar according to the saddle stitching stapling includes two overlapping regions (not illustrated). Sizes of the two overlapping regions configuring one connection region ar are the same.

In the following description, a direction of the sheet S will be described by using an XY coordinate system. An X-axis indicates a lateral direction of the sheet S. A Y-axis indicates a longitudinal direction of the sheet S. Hereinafter, the direction of the X-axis will also be simply referred to as a lateral direction. Hereinafter, the direction of the Y axis will also be simply described as a longitudinal direction.

The information generating device 10 according to at least one embodiment determines a size of the connection region ar when a toner image is formed on a plurality of sheets S to be connected. In certain embodiments, the size of the connection region ar indicates a length of the connection region ar in a connection direction (X direction in the example of FIG. 4). Hereinafter, the length of the connection region ar in the connection direction is also referred to as a "connection length".

Figure 5:
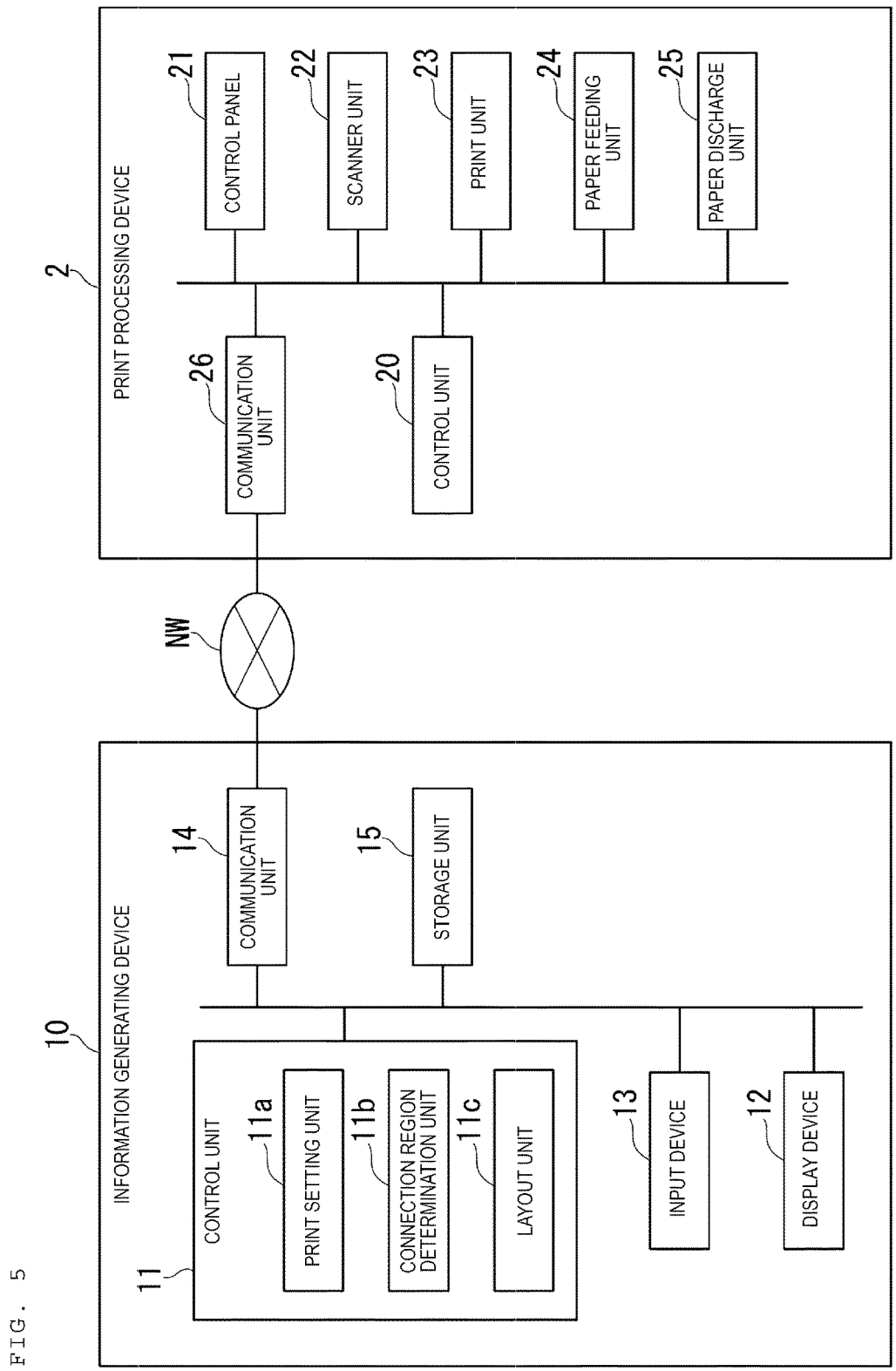
FIG. 5 is a functional configuration diagram illustrating an example of a configuration of an information generating device according to at least one embodiment.

FIG. 5 is a functional configuration diagram illustrating an example of a configuration of the information generating device 10 according to at least one embodiment.

The information generating device 10 includes a control unit 11, the display device 12, the input device 13, a communication unit 14, and a storage unit 15. The communication unit 14 receives information from the print processing device 2 and supplies the information to the control unit 11. In addition, the communication unit 14 transmits information generated by the control unit 11 to the print processing device 2.

A user inputs various kinds of information using the input device 13. The input device 13 receives sheet information on the plurality of sheets S connected by the print processing device 2. The sheet information includes, for example, a size of the sheet S to be connected, the number of sheets S, an orientation, and the like. The display device 12 displays various kinds of information and presents the information to the user, based on control of the control unit 11.

The control unit 11 includes a central processing unit (hereinafter, referred to as a CPU), and executes a program stored in the storage unit 15 to realize various functions. The control unit 11 realizes, for example, a print setting unit 11a, a connection region determination unit 11b, and a layout unit 11c as functional units thereof.

The print setting unit 11a is a function unit that provides a setting function relating to printing of the sheet S. The print setting unit 11a is, for example, a function unit that provides a printer driver. In at least one exemplary implementation, the display device 12 displays an image (hereinafter, referred to as a printer driver screen IM) relating to various kinds of settings in the printer driver. In addition, a user inputs setting (sheet information) relating to the printing of the sheet S to the input device 13 in accordance with display of the printer driver screen IM on the display device 12.

The print setting unit 11a acquires the setting relating to the printing of the sheet S performed based on the printer driver screen IM as print setting information. In other words, the print setting information includes information indicating that as post-processing, saddle stitching stapling is performed or bundle binding stapling is performed.

Figure 6:
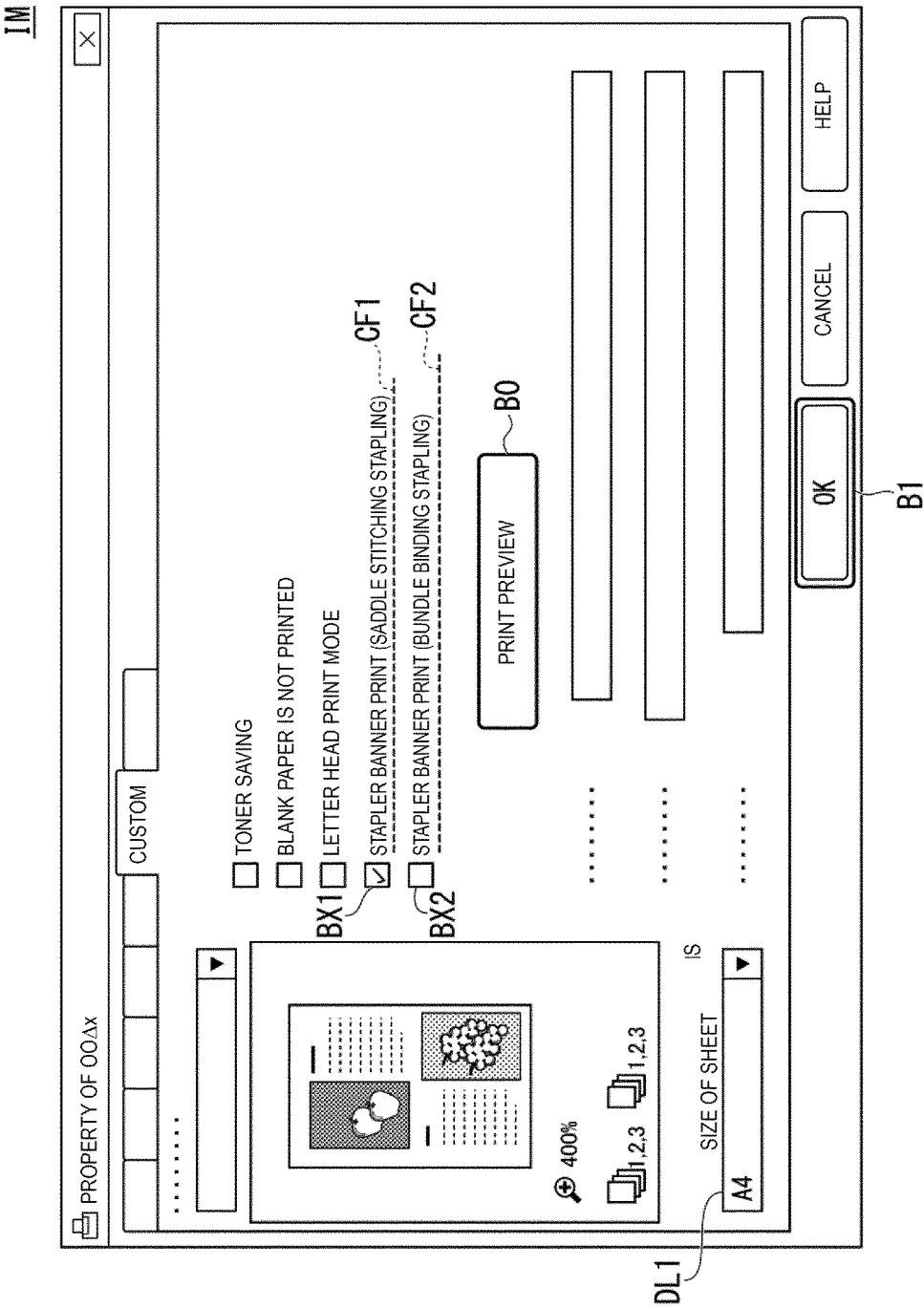
FIG. 6 is a view illustrating an example of a printer driver screen displayed by a display device.

FIG. 6 is a view illustrating an example of the printer driver screen IM displayed by the display device 12. The printer driver screen IM includes an image illustrating the setting relating to the printing of the sheet S. In addition, the printer driver screen IM includes information indicating setting relating to post-processing of the sheet S. The print setting unit 11a causes the display device 12 to display the printer driver screen IM in accordance with reception of the print processing by the information generating device 10 and receives the setting relating to the printing.

The printer driver screen IM includes, for example, a message indicating setting CF1 and setting CF2. The message indicating the setting CF1 is, for example, "stapler banner printing (saddle stitching stapling)" as illustrated. In addition, the message indicating the setting CF2 is, for example, "stapler banner printing (bundle binding stapling)" as illustrated. In addition, a check box (illustrated check box BX1) for selecting whether the setting CF1 is chosen or not is provided in the printer driver screen IM. A check box (illustrated checkbox BX2) for selecting whether the setting CF2 is chosen or not is provided in the printer driver screen IM.

In addition, a drop-down list DL1 for selecting a size of the sheet S is provided in the printer driver screen IM. A print preview button B0 and a determination button B1 are provided in the printer driver screen IM. The print preview button B0 is a button for displaying a print preview image. The print preview image has a print image when printing is performed according to various kinds of settings based on the printer driver screen IM. The print preview image receives a change of a connection length made by a user. Details of the print preview image will be described below in FIG. 12. The determination button B1 is a button for determining various kinds of settings based on the printer driver screen IM. While not illustrated in FIG. 6, the printer driver screen IM may further have an interface for inputting the number of sheets S to be connected. In at least one embodiment, the minimum number of sheets required to carry an image based on enlarged or reduced image data is calculated.

When the saddle stitching stapling is performed on the sheet S, a user checks the check box BX1 included in the printer driver screen IM using the input device 13. In addition, when the bundle binding stapling is performed on the sheet S, the user checks the check box BX2 included in the printer driver screen IM using the input device 13. When specifying a size of the sheet S to be connected, a user selects a desired size from the drop-down list DL1. When displaying the print preview image, the user activates the button B0. When the setting relating to the printing of the sheet S is completed based on the printer driver screen IM, the user activates the butt on B1 and determines various kinds of settings including the connection length.

Returning to FIG. 5, the connection region determination unit 11b determines a connection length of each of the connection regions ar formed on the plurality of sheets S to be connected. The connection region determination unit 11b determines the connection length based on a size of image information and a size of the sheet S to be connected.

A layout unit 11c determines a layout of a toner image to be formed on the sheet S, based on the image information, and information (hereinafter, referred to as connection length information) indicating the connection length determined by the connection region determination unit 11b.

The communication unit 14 transmits the connection length information determined by the connection region determination unit 11b and the layout information generated by the layout unit 11c to the print processing device 2. The communication unit 26 included in the print processing device 2 receives the connection length information and the layout information and supplies the information to the control unit 20. The control unit 20 forms characters or an image to be formed on the sheet S as a toner image, based on the connection length information and the layout information. Specifically, the control unit 20 forms the toner image such that characters and image to be formed are disposed at a location indicated by the layout information. The print processing device 2 discharges the sheet S on which the toner image is formed from the paper discharge unit 25 to the post-processing device 3. In addition, the print processing device 2 supplies post-processing information to the post-processing device 3. The post-processing device 3 performs the saddle stitching stapling or the bundle binding stapling on the sheet S discharged from the print processing device 2, based on the post-processing information.

Figure 7:
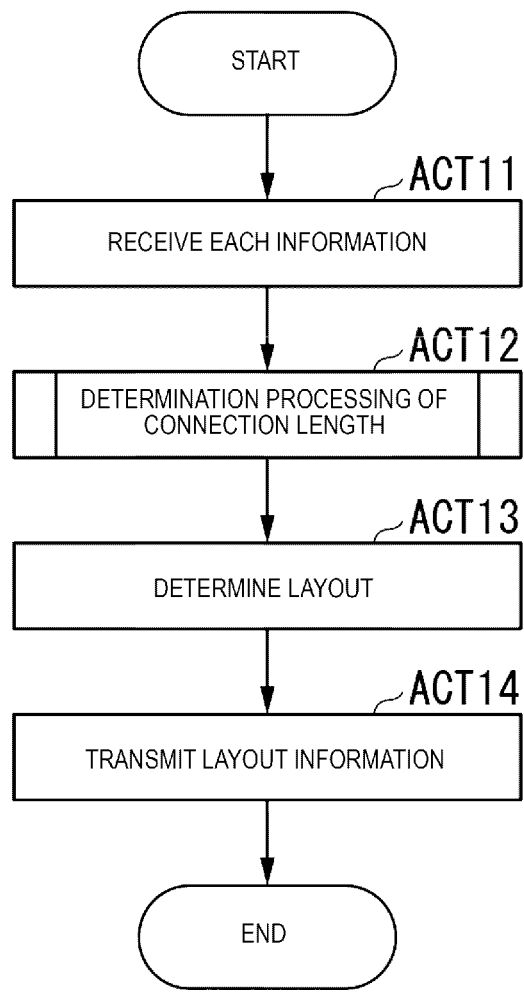
FIG. 7 is a flowchart illustrating an example of an operation of the information generating device according to at least one embodiment.

Hereinafter, an operation of the information generating device 10 will be described with reference to FIG. 7 and FIG. 8. FIG. 7 is a flowchart illustrating an example of the operation of the information generating device 10 according to at least one embodiment.

The communication unit 14 included in the information generating device 10 receives image information of a print target and print setting information from the print processing device 2 or an external apparatus (ACT 11). The connection region determination unit 11b determines the connection length information of the sheet S, based on a size of the image information and a size of the sheet S (ACT 12). Details of the processing of the connection region determination unit 11b will be described with reference to FIG. 8. The layout unit 11c determines a layout of a toner image to be formed on the sheet S, based on the image information and the connection length information determined by the connection region determination unit 11b (ACT 13). The communication unit 14 transmits the image information and the layout information determined by the layout unit 11c to the print processing device 2 (ACT 14).

Figure 8:
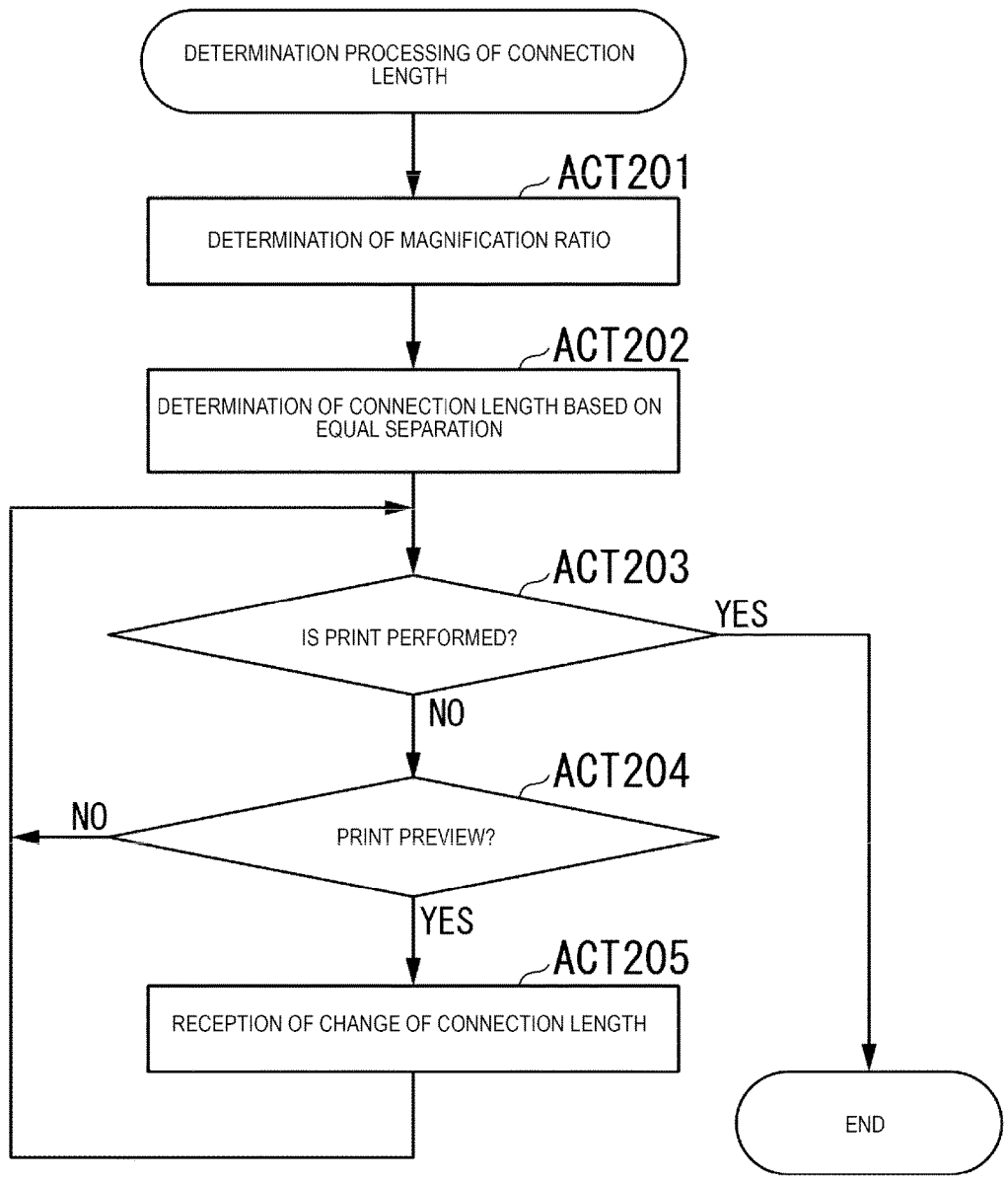
FIG. 8 is a flowchart illustrating an example of an operation (ACT 12) of a connection region determination unit.

FIG. 8 is a flowchart illustrating an example of the operation (ACT 12) of the connection region determination unit 11b. The connection region determination unit 11b determines a magnification ratio of the image information of a print target (ACT 201). The connection region determination unit 11b sets the magnification ratio of the image information, based on a length of the sheet S, which is specified by the sheet information received by the input device 13, in a direction orthogonal to the connection direction of the sheet S. The magnification ratio indicates either an enlargement ratio or a reduction ratio. Hereinafter, the direction orthogonal to the connection direction is also referred to as an orthogonal direction. Specifically, the connection region determination unit 11b sets a magnification ratio in which the length of the image information in the orthogonal direction coincides with the length of the sheet S in the same direction. In the example of FIG. 4, the connection direction is a lateral direction (X direction) and the orthogonal direction is a longitudinal direction (Y direction).

The connection region determination unit 11b determines the connection length, based on the set magnification ratio and the lengths of the plurality of sheets S specified by the sheet information in the connection direction (ACT 202). Specifically, the connection region determination unit 11b determines the connection length, based on a length (first length) in the connection direction when the image information is converted according to the set magnification ratio, and a total length (second length) of the respective sheets S to be connected in the connection direction. For example, the connection region determination unit 11b determines the connection length in accordance with an equal division method. The equal division method is a method of determining connection lengths of the plurality of connection regions ar to an equal length. Details of the processing ACT 201 and the processing ACT 202 will be described below with reference to FIG. 9, FIG. 10, and FIG. 11.

The connection region determination unit 11b determines whether or not the print button B1 of the printer driver screen IM (FIG. 6) is activated (ACT 203). When the print button B1 is activated (ACT 203: YES), the connection region determination unit 11b ends processing. When the print button is not activated (ACT 203: NO), the connection region determination unit 11b determines whether the print preview button B0 of the printer driver screen IM is activated or not (ACT 204).

Figures 11, 12:
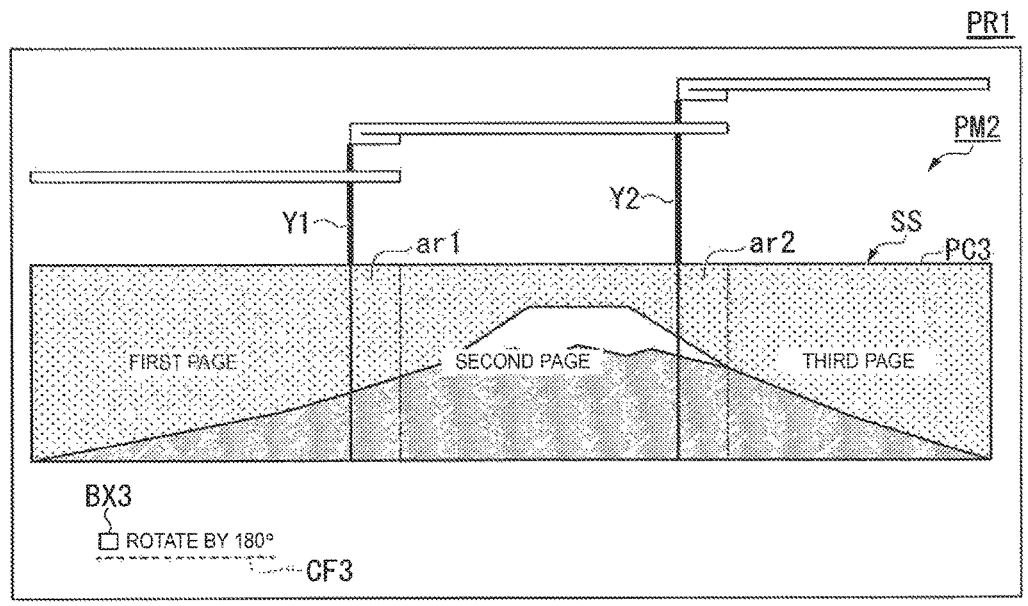
FIG. 11 is a diagram illustrating connection lengths of respective print images.
FIG. 12 is a view illustrating an example of a print preview image.

When the print preview button B0 is activated (ACT 204: YES), the connection region determination unit 11b displays a print preview image (FIG. 12). In the print preview image, the connection region determination unit 11b receives a change in the connection length made by a user (ACT 205). If the print preview image ends, the connection region determination unit 11b updates the connection length information and transits to the processing ACT 203. That is, the connection region determination unit 11b waits for the activation of the print button B1.

Here, the processing ACT 201 and the processing ACT 02 of FIG. 8 will be described with reference to FIG. 9, FIG. 10, and FIG. 11. In this example, a case where three sheets S are to be connected in a lateral direction will be described in the same manner as in the example of FIG. 4. Hereinafter, a plurality of the connected sheets S are also referred to as a connection sheet SS.

Figure 9:
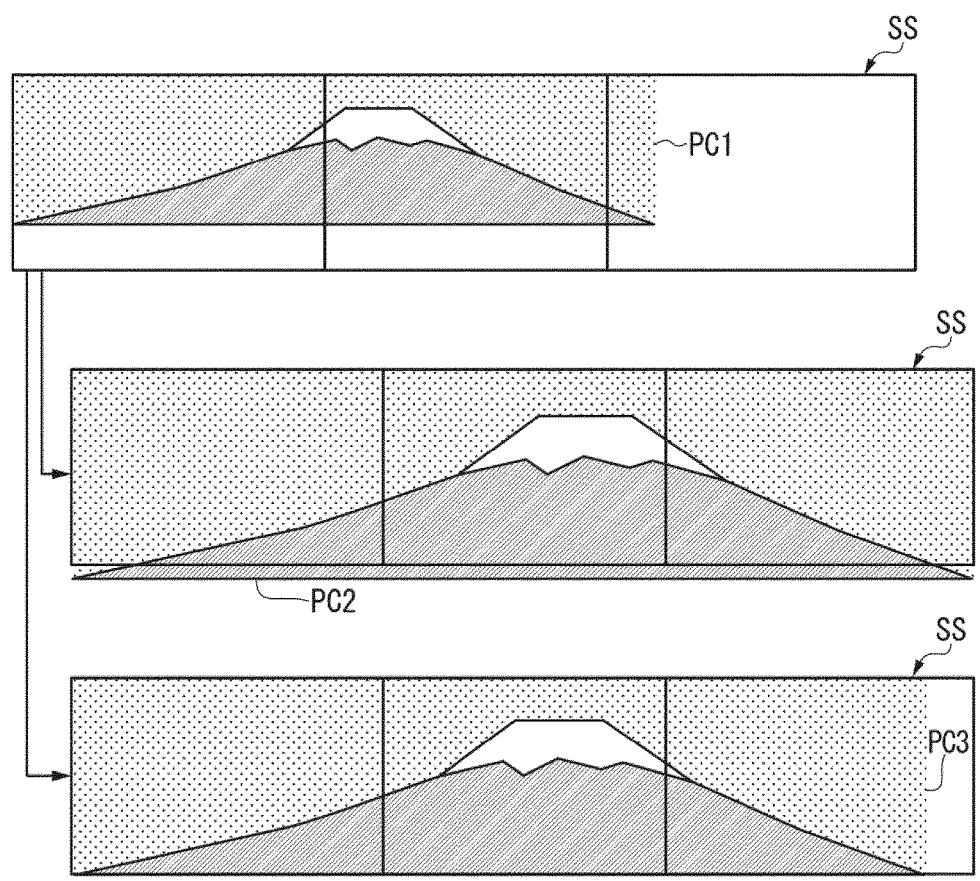
FIG. 9 is a view illustrating a correspondence relationship between a size of image information of a print target and a size of a connected sheet.

FIG. 9 is a view illustrating a correspondence relationship between a size of the image information to be printed and a size of the connection sheet SS. The connection sheet SS illustrated in FIG. 9 is an example in a case where the plurality of sheets S are connected in accordance with a predetermined connection length. Image information PC1 is image information to be printed.

A size of the image information PC1 illustrated in FIG. 9 does not coincide with the size of the connection sheet SS.

Accordingly, a margin region is generated in the connection sheet SS in the lateral direction and the longitudinal direction.

An image information PC2 illustrated in FIG. 9 is an image in which the image information PC1 is enlarged such that a length of the image information PC1 in the lateral direction coincides with a length of the connection sheet SS in the lateral direction. In the example of FIG. 9, an aspect ratio of the image information PC1 does not coincide with an aspect ratio of the connection sheet SS. Accordingly, according to the image information PC2 enlarged based on the length in the lateral direction, a length of the image information PC2 in the longitudinal direction is not fit a length of the connection sheet SS in the longitudinal direction. That is, a print surface of the connection sheet SS is insufficient.

Image information PC3 illustrated in FIG. 9 is an image in which the image information PC1 is enlarged such that the length of the image information PC1 in the longitudinal direction coincides with the length of the connection sheet SS in the longitudinal direction. As described above, the aspect ratio of the image information PC1 does not coincide with the aspect ratio of the connection sheet SS. Accordingly, according to the image information PC3 enlarged based on the length in the longitudinal direction, a margin region is generated in the lateral direction of the connection sheet SS. That is, a margin region not intended by a user is generated.

As such, if the aspect ratio does not coincide between the image information PC1 and the connection sheet SS, an insufficient print surface of the connection sheet SS or an unintended margin region is generated. In the example of FIG. 9, a case where the image information PC1 is enlarged is exemplified. However, the same also applies to a case where the length of the image information PC1 in the longitudinal direction is larger than the length of the sheet S in the longitudinal direction and the image information PC1 is reduced.

Thus, the connection region determination unit 11b according to at least one embodiment sets a magnification ratio of the image information PC1, based on a length of the sheet S in an orthogonal direction orthogonal to the connection direction of the sheet S. The length of the sheet S in the orthogonal direction is determined according to a size of the sheet S. The size of the sheet S is specified according to, for example, the sheet information input via the printer driver screen IM, or a default value of the sheet information. If the image information PC1 is converted according to the set magnification ratio, the connection region determination unit 11b distributes the margin region generated in the connection sheet SS to the connection region ar. Thereby, it is possible to determine the connection length of the connection sheet SS in which an insufficient print surface or an unintended margin region is not generated, without a change in the aspect ratio of the image information PC1 of a print target.

Figure 10:
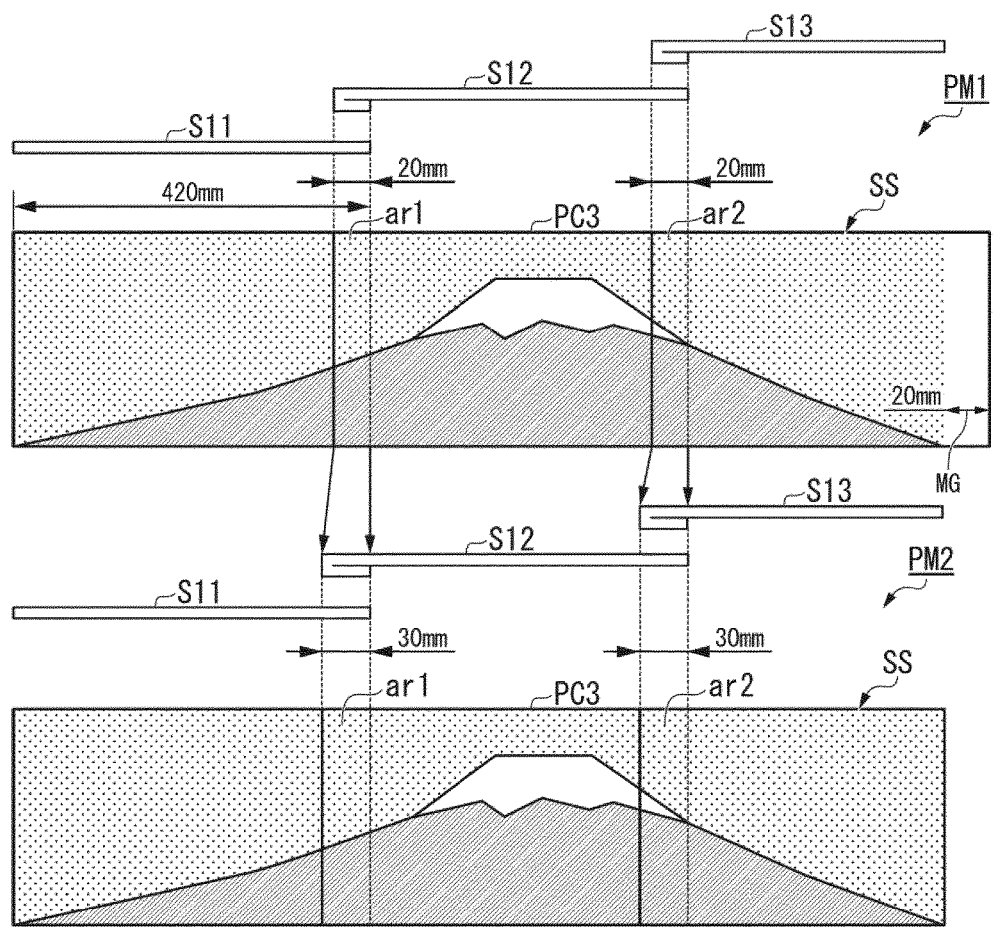
FIG. 10 is a view schematically illustrating an example of determination processing of connection length information.

FIG. 10 is a view schematically illustrating an example of determination processing of the connection length information. The image information PC3 illustrated in FIG. 10 is an image enlarged such that the length of the image information PC1 in the longitudinal direction coincides with the length of the sheet S in the longitudinal direction.

The connection sheet SS of a print image PM1 illustrated in FIG. 10 is an image when being connected based on a predetermined connection length. The predetermined connection length is a default value set according to the size of the sheet S to be connected. In the example of FIG. 10, a case where, for example, the sheet S of an A4 size is connected is exemplified. The default value of the connection length when the sheet S of an A4 size is connected is, for example, a value of "20 mm". In this case, a margin region MG having a length of "20 mm" is generated between the connection sheet SS and the image information PC3. Thus, the connection region determination unit 11b equally distributes the length of "20 mm" of the margin region MG to each of the connection regions ar1 and ar2. The connection region determination unit 11b increases the connection length of each of the connection regions ar1 and ar2 by a value of "5 mm (=20 mm÷4)".

The connection sheet SS of a print image PM2 illustrated in FIG. 10 is an image when the connection length is increased by s value of "10 mm". As the connection length is increased, there is no margin area MG between the connection sheet SS and the image information PC3. As such, the size of the image information PC3 becomes the same as the size of the connection sheet SS by distributing the margin region MG to the connection region ar.

In FIG. 10, the connection length is calculated based on the size of the connection sheet SS when being connected in accordance with a default connection length according to the size of the sheet S, and the size of the converted image information PC3. That is, the processing of distributing the margin region MG which is generated when being connected based on a predetermined connection length, to each of the connection regions ar1 and ar2 is exemplified. The connection region determination unit 11b may calculate the connection length, based on the size of the sheet S, the number of sheets S, and the size of the enlarged image information PC3.

Specifically, the connection region determination unit 11b acquires a total length of the sheets S of the number to be connected in the connection direction. In addition, the connection region determination unit 11b acquires the length of the image information PC3 converted by the determined magnification ratio in the connection direction. The connection region determination unit 11b acquires a difference between the acquired sum and the length of the image information PC3 in the connection direction. The connection region determination unit 11b determines the value obtained by dividing the difference by the number of the connection regions ar as the connection length of each connection region ar.

Determination processing for this connection length about the saddle stitching stapling is represented by the equation "((L1×n)−L2)÷{(n−1)×2}". A value "n" of the equation is the number of sheets to be connected. According to the example of FIG. 10, "n=3". A value "L1" represents the length of a sheet in the connection direction. According to the example of FIG. 10, "L1=420 mm". A value "L2" represents the length of an enlarged image information PC3 in the connection direction. According to the example of FIG. 10, "L2=1160 mm". The connection region determination unit 11b determines a connection length "25 mm" in accordance with the equation "((420×3)−1160)÷4".

As such, the connection region determination unit 11b sets a magnification ratio of the image information PC1 in which the length of the image information PC1 in the orthogonal direction coincides with the length of the sheet S specified by the sheet information received by the input device 13 in the same direction. The connection region determination unit 11b determines the connection length, based on the set magnification ratio and the lengths of the plurality of sheets S in the connection direction. That is, the connection region determination unit 11b equally divides the difference between the length in the connection direction obtained when the image information PC1 is converted using the set magnification ratio and the total length of that number of sheets S in the connection direction, into the connection lengths of the respective connection regions ar. Thereby, the connection region determination unit 11b can determine the connection length of the connection sheet SS in which an insufficient print surface or an unintended margin region is not generated, without changing the aspect ratio of the image information PC1.

FIG. 11 is a diagram illustrating the connection lengths of respective print images. A table H11 illustrated in FIG. 11 illustrates the connection lengths of the print image PM1 of FIG. 10. As described above, a size of an overlapping region and a fold-back region configuring one connection region ar are the same. Thus, a length of the overlapping region of the left end portion sheet S11 and a length of the fold-back region of the central sheet S12 are the value of "20 mm". Likewise, a length of the overlapping region of the central sheet S12 and a length of the fold-back region of the right end portion sheet S13 are the same value of "20 mm".

A length of the print surface of the left end portion sheet S11 is a value of "400 mm" obtained by subtracting the length of the overlapping region from a value of "420 mm". Likewise, a length of the print surface of the central sheet S12 is a value of "380 mm" obtained by subtracting the length of the fold-back region and the length of the overlapping region from the value of "420 mm". Likewise, a length of the print surface of the right end portion sheet S13 is a value of "400 mm".

The table H12 illustrated in FIG. 11 illustrates the respective connection lengths of the print image PM2 of FIG. 10. The respective connection lengths of the print image PM2 is a value of "25 mm". That is, a length of the fold-back region and the overlapping region is a value of "25 mm". Accordingly, lengths of the print surfaces of the left end portion sheet S11 and the right end portion sheet S13 are a value of "395 mm". Likewise, a length of the print surface of the central sheet S12 is a value of "370 mm".

In the above-described embodiment, processing of determining the connection length such that no margin region is generated in the connection sheet SS is described. However, an arbitrary margin region may be provided in the connection sheet SS. Hereinafter, the arbitrary margin region will be referred to as a "designated margin region".

In this case, the connection region determination unit 11b determines a magnification ratio of the image information PC1 in which the length of the image information PC1 in the orthogonal direction coincides with the length of the sheet S in the same direction. The connection region determination unit 11b acquires a difference between the length in the connection direction when the image information PC1 is converted in the determined magnification ratio and a sum of the sheets S of the number of sheets in the connection direction. The connection region determination unit 11b equally divides the length obtained by subtracting the length of the designated margin region in the connection direction from the difference into the connection lengths of the respective connection regions ar.

Thereby, it is possible to determine the connection length of the connection sheet SS having an arbitrary margin region without changing the aspect ratio of the image information PC1 of a designated print target. In other words, it is possible to make a size of the image information PC11 enlarged or reduced while maintaining the aspect ratio coincide with a size excluding an arbitrary margin region from the connection sheet SS.

Here, processing of receiving a change of the connection length based on the print preview image described in the processing (ACT 205) of FIG. 8 will be described. In the processing ACT 202 described above, a case where the connection region determination unit 11b determines the connection lengths of the respective connection regions ar to be an equal length is exemplified. The connection region determination unit 11b may determine the connection lengths of the respective connection regions ar to be an unequal length. In other words, the connection region determination unit 11b may determine the connection length of some of the connection regions ar to be different from the connection length of the other connection regions ar. As described above, for example, a user can change the connection lengths of the respective connection regions ar by operating the print preview image.

FIG. 12 is a view illustrating an example of the print preview image PR1. As described above, if the print preview button B0 provided in the printer driver screen IM (FIG. 6) is activated, the print preview image PR1 is displayed. The print image PM2, change lines Y1 and Y2 of the connection length, a message indicating setting CF3, and a check box BX3 are provided in the print preview image PR1.

The print image PM2 has the connection sheet SS whose connection length is determined based on the equal division method. The image information PC3 of the print image PM2 is an image enlarged such that the length in the longitudinal direction thereof coincides with the length of the sheet S.

The message indicating the setting CF3 is, for example, "rotate by 180°" as illustrated. In addition, a check box (illustrated check box BX3) for selecting whether the setting CF3 is chosen or not is provided in the printer driver screen IM. When the image information is rotated by 180°, a user checks the check box BX3 using the input device 13.

The change line Y1 is a user interface that changes the connection length of the connection region ar1. The user changes the connection length of the connection region ar1 by moving the change line Y1 to the left and right on the print preview image. Likewise, the change line Y2 is a user interface that changes the connection length of the connection region ar2. A user changes the connection length of the connection region ar2 by moving the change line Y2 to the left and right on the print preview image. The input device 13 receives an input of the connection lengths of the respective connection regions ar.

When the connection length of some of the connection regions ar is changed by the user, the connection region determination unit 11b may change the connection length in conjunction with connection lengths of other connection regions ar. For example, when the user changes the connection length of the connection region ar1 to be short, the margin region MG is generated. In this case, for example, the connection region determination unit 11b changes the connection length of the connection region ar2 to be long as much as the connection length of the connection region ar1 is changed to be short, and displays it in the print preview image PR1.

The same applies to a case where the connection length of the connection region ar1 is changed by the user to be long. In this case, the connection region determination unit 11b changes the connection length of the connection region ar2 to be short as much as the connection length of the connection region ar1 is changed to be long. Thereby, when the connection lengths of the respective connection regions ar are individually changed, it is possible to determine the connection length in which an unintended margin region MG is not generated.

Even when the connection length of some of the connection regions ar is changed, the connection region determination unit 11b may not change the connection length of other connection regions ar correspondingly. In this case, the connection region determination unit 11b displays the margin region MG generated by a change or an insufficient region of the print surface in the preview image PR1 so as to be distinguishable. Thereby, a user can appropriately change the connection length, based on the preview image PR1.

Figure 13:
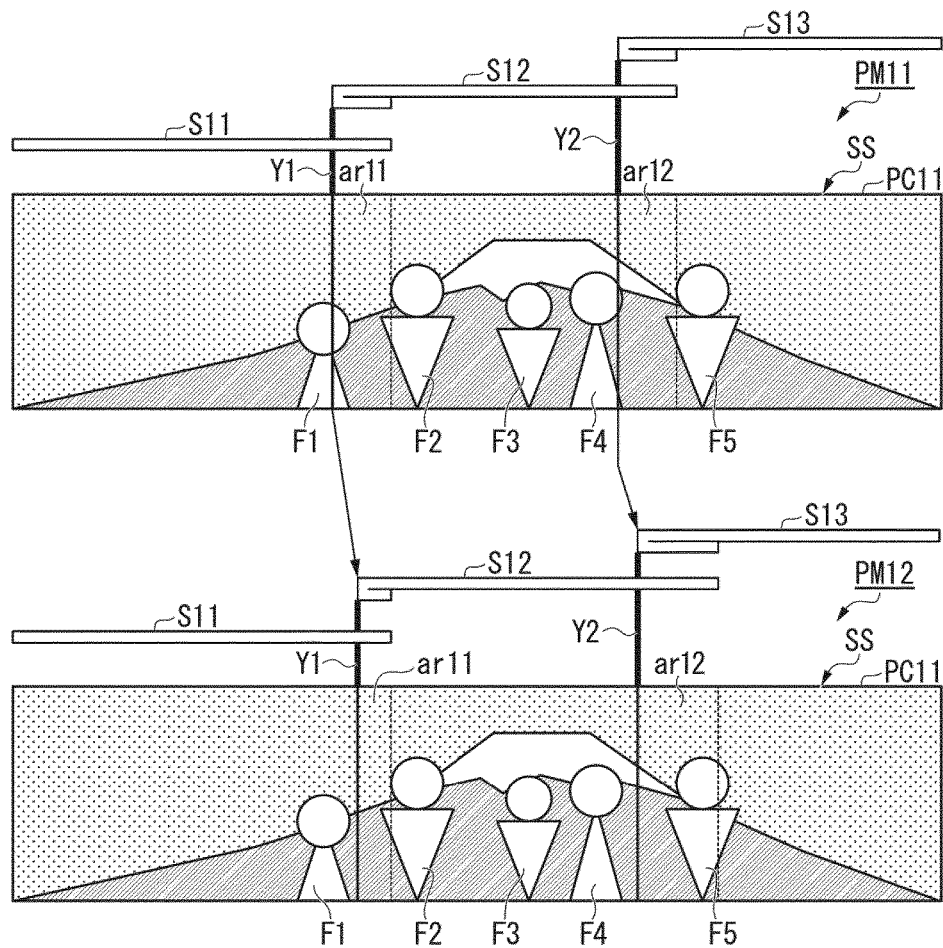
FIG. 13 is a view illustrating an example of a print image when connection lengths of respective connection regions are changed.

FIG. 13 is a view illustrating an example of a print image when the connection lengths of respective connection regions ar are changed. In FIG. 13, the same elements as described in FIG. 12 are denoted by the same reference numerals or symbols. The image information PC11 illustrated in FIG. 13 includes images of five persons F1 to F5. Solid lines in the image information PC11 indicate separations of the sheet S.

The print image PM11 is a print image obtained when the connection lengths of the connection regions ar11 and ar12 are equal. According to the print image PM11, the division of the sheet S is located at face portions of the person F1 and the person F4. Depending on a user, it seems undesirable to make the division of the sheet S to be located at the face portion of the person. For such a user, it is desirable that the division of the sheet S be changed to locations other than the face portions of the persons F1 to F5.

A print image PM12 is a print image when the location of the division of the sheet S is changed. In the print image PM12, the connection length of the connection region ar11 is changed to be shorter than the connection length of the print image PM11, and the connection length of the connection region ar12 is changed to be longer. That is, the connection lengths of the connection regions ar11 and ar12 are different from each other. By this change, the division of the sheet S is located at different locations from the face portions of the person F1 and the person F4.

FIG. 14 is a diagram illustrating the connection lengths of respective print images. A table H21 illustrated in FIG. 14 illustrates the connection lengths of the print image PM11 of FIG. 13. A table H22 illustrates results of the respective connection lengths of the print image PM12 in FIG. 13.

According to the table H21 and the table H22, the connection length of one connection region ar11 is changed to be short by a value "10 mm" and the connection length of the connection region ar12 is changed to be long by a value "10 mm". The connection lengths of the respective connection regions ar are unequal. However, a total value of the connection regions ar is the same before and after the change, and thereby, an insufficient print surface or an unintended margin region is not generated.

In FIG. 12, a case where the image information PC11 includes an image of a person is exemplified. However, at least one embodiment is effective even when the image information PC11 includes an image of a logo or a character string, and the division location of the sheet S is set in a place other than the logo or the character string. Alternatively, it is also effective when the division location of the sheet S is set in any desired location depending on the use of the connection sheet SS.

As such, the connection region determination unit 11b may unequally divides the difference between the length in the connection direction obtained when the image information PC1 is converted and the total length of that number of sheets S in the connection direction, into the respective connection regions ar. That is, the connection region determination unit 11b may determine the connection length of at least one of the plurality of connection regions ar as a length different from the connection length of the other connection regions ar.

Thereby, a user can change the connection length such that the division of the sheet S is located at a desired location according to the content of the image information PC11. As such, by paying attention to the respective connection lengths of the connection regions ar, the connection region determination unit 11b makes it possible to adjust the division location of the sheet S. Thus, the connection region determination unit 11b can change the division location of the sheet S to a desired location while suppressing occurrence of insufficient print surface or generation of a margin region.

In addition, the information generating device 10 includes the input device 13 that receives inputs of the respective connection lengths of the plurality of connection regions ar and the display device 12. The display device 12 displays the image information and the connection regions ar, based on the respective connection lengths received by the input device 13. Thereby, a user can change the connection lengths of the respective connection regions ar to an arbitrary length while confirming the division location of the printed sheet S.

Even when the connection lengths of the respective connection regions ar are determined to an unequal length, the specified margin region may be provided in the connection sheet SS. The connection region determination unit 11b acquires a difference between a length in the connection direction obtained when the image information PC1 is converted using the determined magnification ratio and the total length of that number of sheets S in the connection direction. The connection region determination unit 11b unevenly divides a length obtained by subtracting the length of the designated margin region in the connection direction from the difference into the connection lengths of the respective connection regions ar.

When setting the division location of the sheet S is set according to the content of the image information PC11, the image information PC11 may be rotated by 180°. In this case, a user checks the check box BX3 of the preview image PR1 (FIG. 12). By rotating the image information PC11 by 180°, a relative location between a location of a face of a person and the division of the sheet S is changed. As such, when a user individually changes the connection lengths, the user can more effectively set the division location of the sheet S by further changing an orientation of the image information PC11.

As described above, the information generating device 10 according to at least one embodiment generates data which is used in the print processing device 2 that can output a print in a state where a plurality of sheets S are connected to each other. The information generating device 10 includes the storage unit 15 that stores the image information, the input device 13, and the control unit 11. The input device 13 receives sheet information on the plurality of sheets S to be connected. The connection region determination unit 11b of the control unit 11 determines the connection lengths of the respective connection regions ar formed when a toner image of the image information is formed on the plurality of sheets S, based on the image information.

The connection region determination unit 11b sets a magnification ratio of the image information of a print target, based on the length of the image information of a print target in the orthogonal direction and the length of the sheet S specified by the sheet information in the orthogonal direction. The connection region determination unit 11b determines the connection length, based on the set magnification ratio and the lengths of the plurality of sheets S to be connected in the connection direction.

Thereby, it is possible to determine the connection lengths of the connection sheet SS in such a manner that an insufficient print surface or an unintended margin region is not generated without changing an aspect ratio of the image information PC1 of a print target. In other words, by using the connection lengths, it is possible to enlarge or reduce a size of the image information PC1 so as to coincide with a size of the connection sheet SS while maintaining the aspect ratio of the image information PC1.

In addition, the connection region determination unit 11*b* determines the connection length, based on the length in the connection direction when the image information is converted according to the magnification ratio, and a total value of the length of the connection sheet SS in the connection direction. Thereby, it is possible to simply determine a connection length in which an insufficient print surface or an unintended margin region is not generated.

In addition, the connection region determination unit 11*b* divides a margin region which is generated when the image information is converted based on the length of the sheet S in the orthogonal direction, into the respective connection regions ar. Thereby, it is possible to more efficiently determine such a connection length that an insufficient print surface or an unintended margin region is not generated.

In the above-described embodiment, determination processing of the connection lengths of the connection regions ar in the bundle binding stapling is described. The determination processing of the connection lengths described above can also be applied to the determination processing for the connection lengths of the connection regions ar in the saddle stitching stapling in the same manner.

In the above-described embodiment, a case where the control unit 11 of the information generating device 10 includes the layout unit 11*c* is described, and certain embodiments are not limited to this. The information generating device 10 may have a configuration in which the connection length information determined by the connection region determination unit 11*b* is transmitted to an external apparatus and the layout of the toner image formed on the sheet S is determined by the external device. In this case, the external apparatus determines the layout, based on the image information and the connection length information received from the information generating device 10. The external apparatus transmits layout information and image information to the print processing device 2. The print processing device 2 forms a toner image on the sheet S, based on the received layout information and the image information.

In the above-described embodiment, a case where sizes of an overlapping region and a fold-back region configuring one connection region ar are the same is exemplified. However, as long as the sheets S are connectable, the size of the overlapping region and the fold-back region configuring the one connection region ar may be different from each other.

Modification Example

In a modification example, determination processing for connection lengths when increasing the number of sheets S to be connected will be described.

In the above-described embodiment, the connection region determination unit 11*b* connects, for example, the minimum number of sheets S necessary for printing the image information PC. For example, the connection region determination unit 11*b* acquires a length in the connection direction when the image information is changed according to the magnification ratio determined in the processing ACT 201. In addition, the connection region determination unit 11*b* calculates, as the number of sheets S, the minimum number of sheets S which provide a length in the connection direction exceeding the length of the obtained converted image information when a plurality of sheets S are connected according to a predetermined connection length.

However, when the minimum number of sheets S are to be connected to each other, there is a case where the division of the sheet S cannot be changed to a desired location. That is, when the connection lengths of the connection regions ar are individually changed, there is a case where the connection lengths of the respective connection regions ar cannot be changed to desired connection lengths because the connection lengths are short.

Thus, the connection region determination unit 11*b* may determine an integer value larger than the minimum number as the number of sheets S to be connected. For example, the connection region determination unit 11*b* increases the number of sheets S to be connected from the minimum number by one. Thereby, the connection lengths of the respective connection regions ar of the connection sheet SS increases, and a change width of the connection length increases. In other words, a degree of freedom of adjustment of the division location of the sheet S increases.

Figure 15:
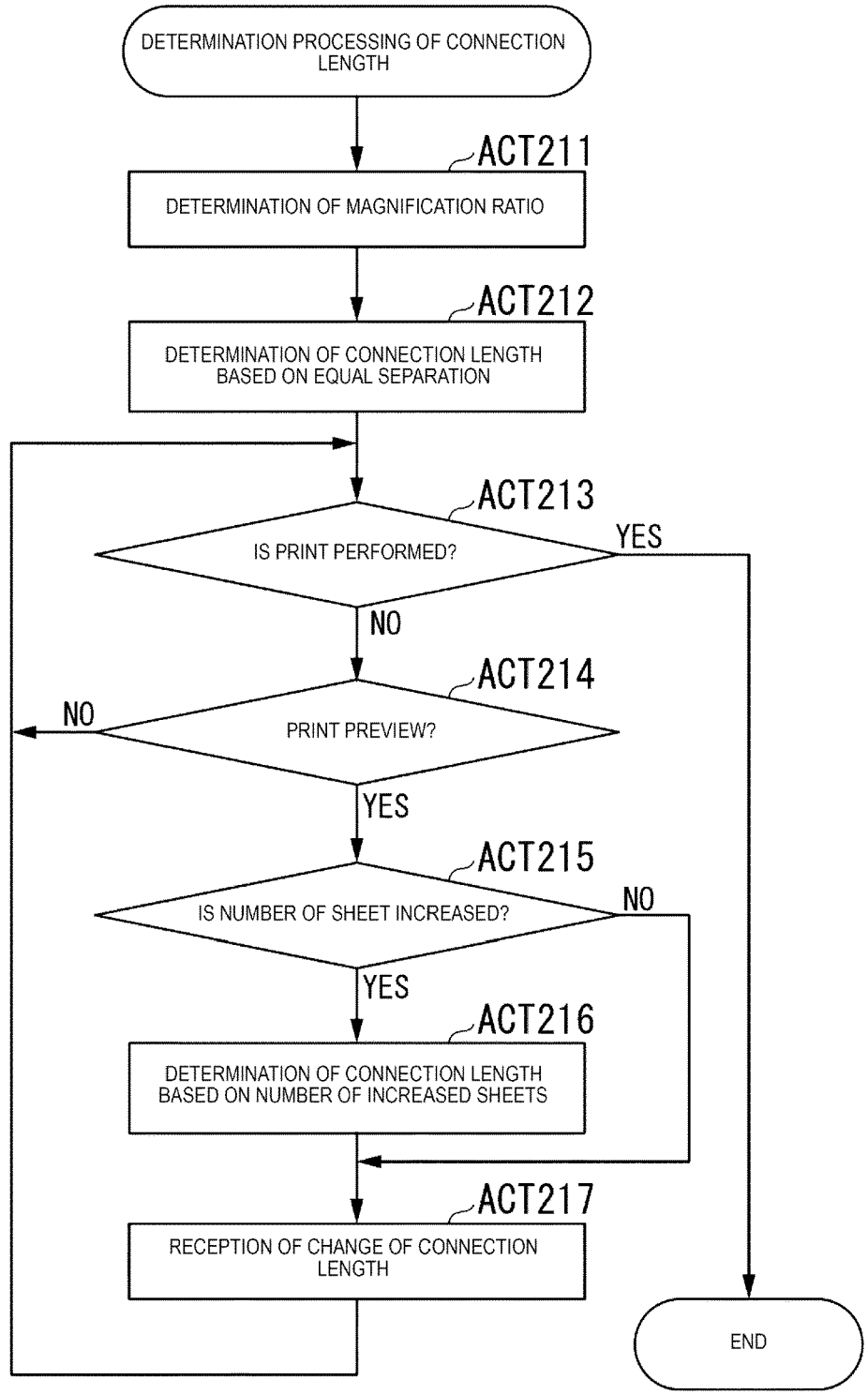
FIG. 15 is a flowchart illustrating an example of an operation (ACT 12) of a connection region determination unit according to a modification example.

FIG. 15 is a flowchart illustrating an example of an operation (ACT 12 of FIG. 7) of the connection region determination unit 11*b* according to the modification example. Processing ACT 211 to ACT 214 of FIG. 15 is the same as processing ACT 201 to ACT 204 of FIG. 8.

If the print preview button B0 (FIG. 6) is activated (e.g., clicked) (ACT 214: YES), the connection region determination unit 11*b* displays a print preview image. In addition, the connection region determination unit 11*b* determines whether or not an instruction to increase the number of sheets S to be connected on the print preview image is input (ACT 215). When the instruction to increase the number of sheets is input (ACT 215: YES), the connection region determination unit 11*b* determines a connection length, based on the sum of the lengths of the increased sheets S in the connection direction (ACT 216). When the instruction to increase the number of sheets is not input (ACT 215: NO), or after processing ACT 216, the connection region determination unit 11*b* receives a change in the connection length (ACT 217). Processing ACT 217 is the same as processing ACT 205 of FIG. 8.

Figure 16:
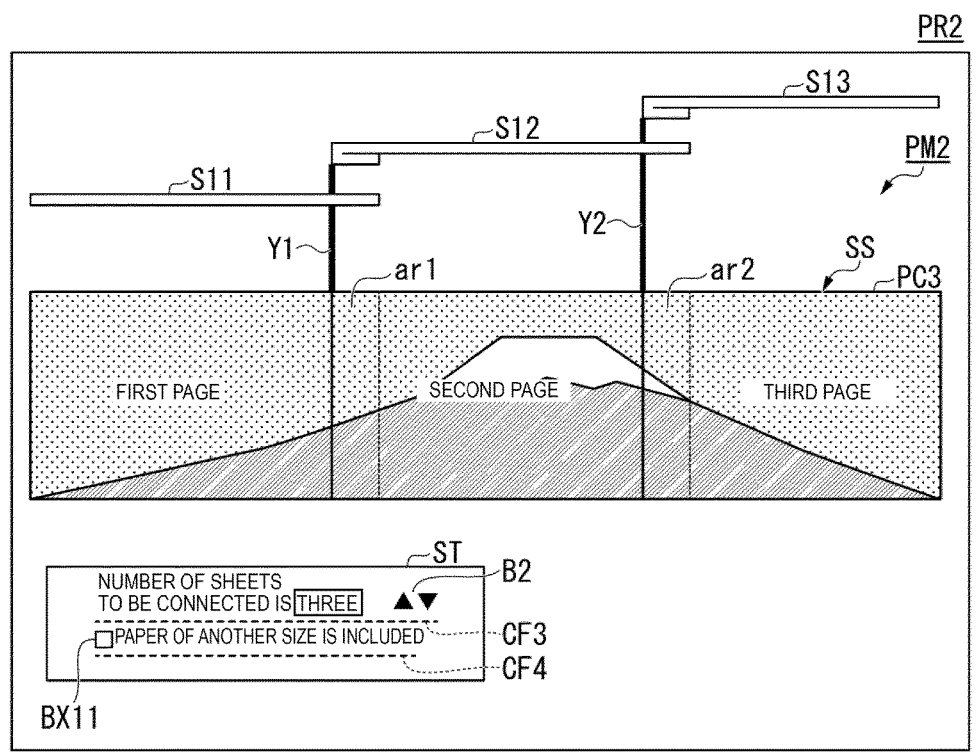
FIG. 16 is a view illustrating an example of a print preview image according to the modification example.

FIG. 16 is a view illustrating an example of the print preview image PR2 according to the modification example. In the print preview image PR2 according to the modification example, a setting item ST is further provided for the print preview image PR1 (FIG. 12). In FIG. 16, elements which are the same as the elements illustrated in FIG. 12 are denoted by the same reference numerals or symbols.

The setting item ST includes, for example, messages respectively indicating setting CF3 and setting CF4. The message indicating the setting CF3 is, for example, "the number of sheets to be connected" as illustrated. The message indicating the setting CF4 is, for example, "paper of another size is included" as illustrated. A button BT2 for changing the number of sheets of the setting CF3 is provided in the setting item ST. In addition, a check box BX11 for selecting whether the setting CF 4 is effective or ineffective is provided in the setting item ST.

When increasing the number of sheets S to be connected, a user activates the button BT2 (e.g., by clicking or touching) to increase the number of sheets. The button BT2 is controlled such that the number of sheets S to be connected cannot be changed to the number smaller than the minimum number. When paper of another size is included, the user checks the check box BX11 using the input device 13. An example in which paper of another size is included will be described below.

Here, determination processing of a connection length when the number of sheets S to be connected increases will be described with reference to FIG. 17 and FIG. 18.

Figure 17:
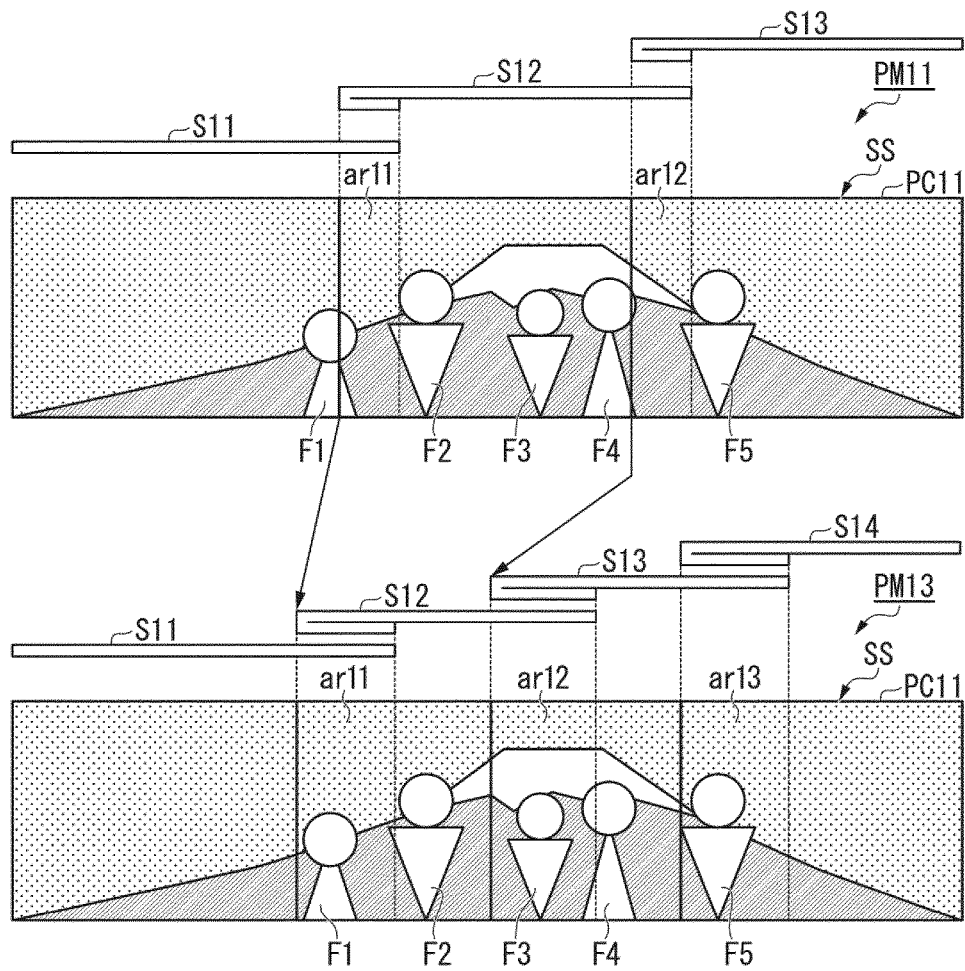
FIG. 17 is a view illustrating an example of a print image when the number of sheets to be connected increases.

FIG. 17 is a view illustrating an example of a print image when the number of sheets S to be connected increases. The print image PM11 illustrated in FIG. 17 is a print image when three sheets S illustrated in FIG. 13 are connected. According to the print image PM11, divisions of the sheets S are located at face portions of a person F1 and a person F4.

A print image PM13 illustrated in FIG. 17 is a print image when four sheets S (S11 to S14) are connected to each other. According to the print image PM13, the divisions of the sheets S are not located at the face portions of the person F1 and the person F4. In addition, a connection length of each of the connection regions ar11, ar12, and ar13 in the print image PM13 is longer than that of the print image PM11. Thereby, the extent of the change increases when the connection length is changed.

FIG. 18 is a diagram illustrating the connection lengths of the respective print images PM11 and PM13 illustrated in FIG. 17. A table H21 illustrates each connection length of the print image PM11, and a table H23 illustrates each connection length of the print image PM13. According to the table H23, as the number of connected sheets increases, the connection lengths of the respective connection regions ar increase from a value of "20 mm" to a value of "83.3 mm".

Figure 19:
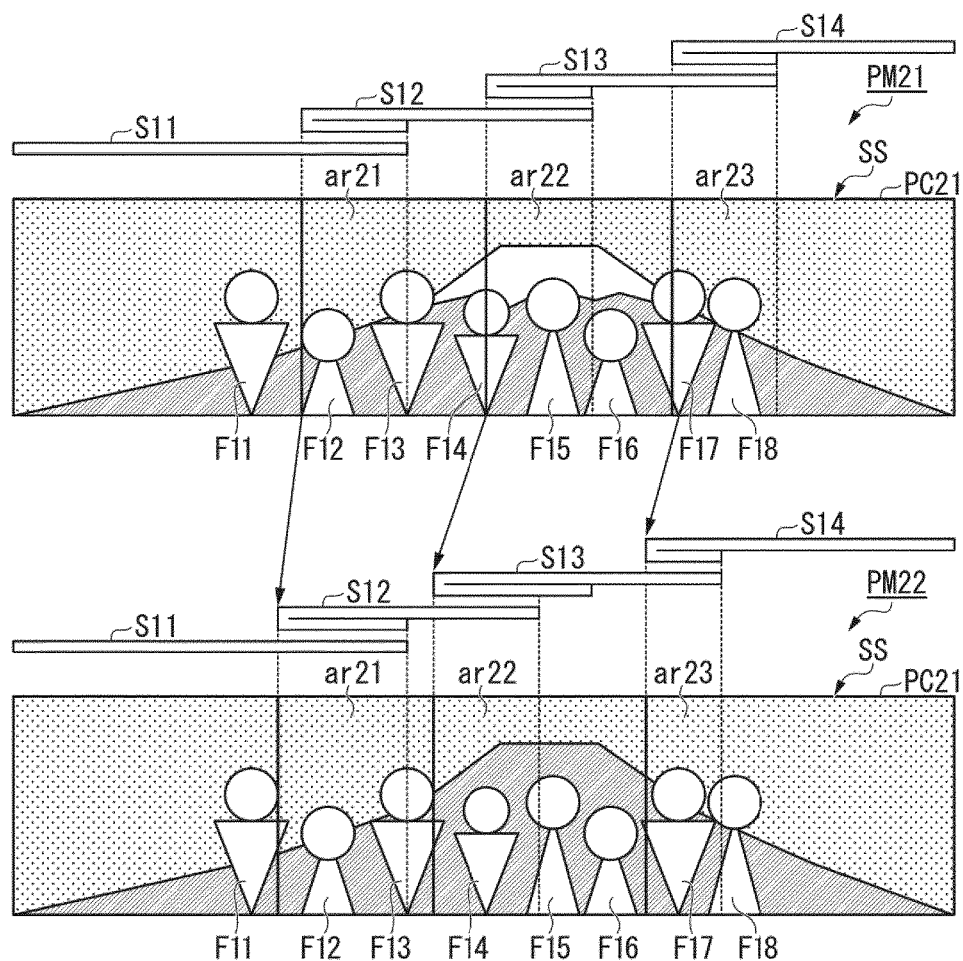
FIG. 19 is a view illustrating an example of a print image when changing the connection lengths when four sheets S are connected.

Here, a print image when a change in the connection length is received (ACT 217) after the number of connected sheets increases will be exemplified with reference to FIG. 19.

FIG. 19 is a view illustrating an example of a print image when the connection lengths are changed when four sheets S are connected. An image information PC21 illustrated in FIG. 19 includes images of eight persons F11 to F18. Solid lines in the image information PC21 indicate divisions of the sheets S.

A print image PM21 is a print image when the connection lengths of the connection regions ar21, ar22, and ar23 are equal to each other. According to the print image PM21, divisions of the sheets S are located at face portions of the person F14 and the person F17.

In contrast to this, a print image PM22 is a print image when the connection lengths of the respective connection regions ar21, ar22, and ar23 are unequal to each other. Due to changes in the connection lengths, the division of the sheet S is not located at the face portions of the person F14 and the person F17 in the print image PM22. As described above, the connection lengths of the respective connection regions ar of the print image PM22 are longer than those when the number of sheets S is three. Since the extent of the change of the connection lengths of the respective connection regions ar are large, it is possible to flexibly change the division location of the sheet S.

A case where the number of sheets S to be connected is increased by one is exemplified in the examples of FIG. 17, FIG. 18, and FIG. 19. However, one or more embodiments are not limited to this example. In the example of FIG. 17, FIG. 18, and FIG. 19, five or more sheets S may be connected.

Here, a print image when paper of another size described in the print preview image PR2 illustrated in FIG. 16 is included will be described. A user can include the sheets S of a plurality of sizes in the connection sheet SS by checking the check box BX11 of the print preview image PR2.

A size of the sheet S of A3 size is "420×297 mm". The size of the sheet S of A4 size is "297×210 mm". As such, a length of "297 mm" of one side of the sheet S of A3 size is equal to a length of "297 mm" of one side of the sheet S of A4 size. Accordingly, it is possible to connect the sheet S of A3 size and the sheet S of A4 size at the sides of the same length.

Figure 20:
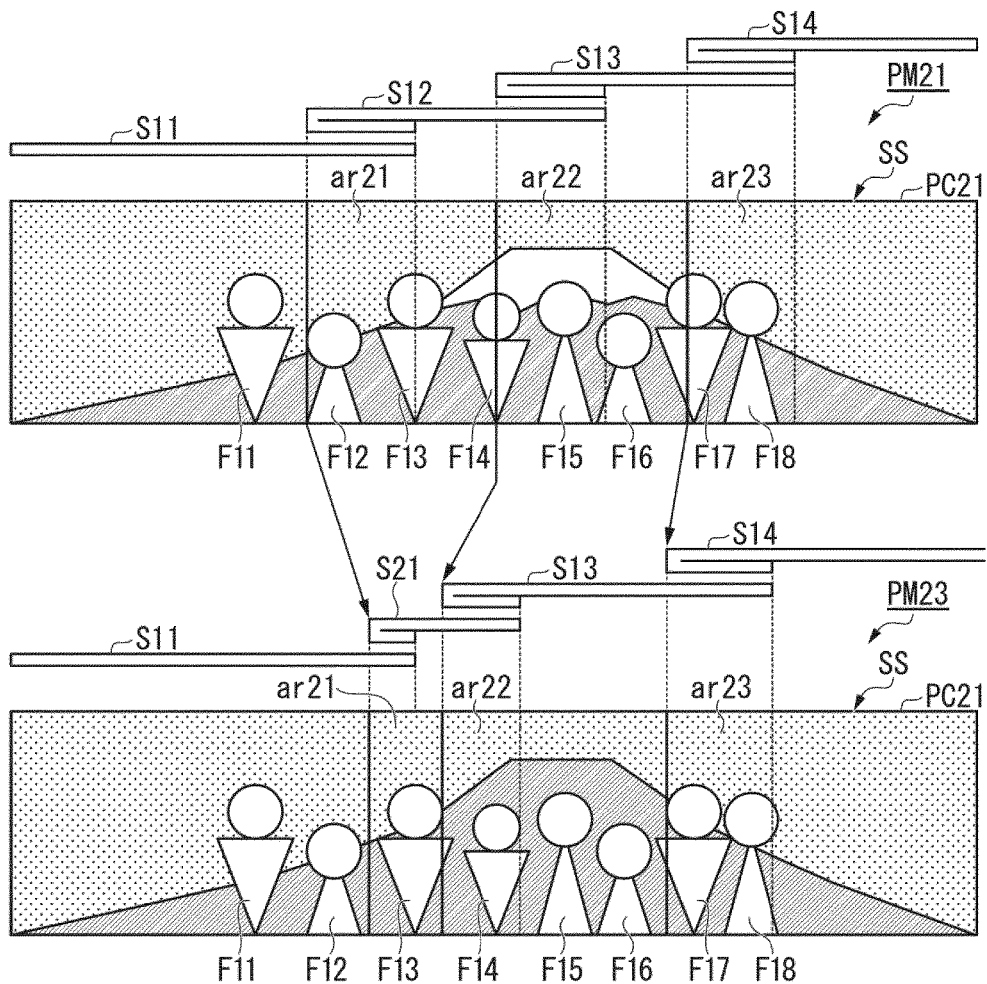
FIG. 20 is a view illustrating an example of the print image when sheets having a plurality of sizes are connected.

FIG. 20 is a view illustrating an example of the print image when the sheets S of a plurality of sizes are connected. The print image PM21 illustrated in FIG. 20 is the same as the print image PM21 illustrated in FIG. 19. The print image PM21 is a print image when four sheets S11 to S14 of A3 size are connected to each other. As described above, according to the print image PM21, the division of the sheet S is located at each of the face portions of the person F14 and the person F17.

In contrast to this, the print image PM23 is a print image obtained when three sheets S11, S13, and S14 of A3 size, and one sheet S21 of A4 size are connected to each other. The location of the division of the sheet S is changed by partially changing the sizes of the sheets S configuring the connection sheet SS. According to the print image PM33, the division of the sheet S is not located at the face portions of the person F11 and the person F17.

As such, in certain embodiments, the plurality of sheets S to be connected may include the sheets S of a plurality of sizes having the same length in the orthogonal direction and different lengths of the connection direction. Thereby, it is possible to more flexibly adjust separation locations of the sheet S. In the example of FIG. 20, a case where a sheet of A4 size is included in a sheet group of A3 size is exemplified, however, at least one embodiment is not limited to this example. The sheet of A3 size may be included in a sheet group of A4 size.

While certain embodiments have been described these embodiments have been presented by way of example only, and are not intended to limit the scope of the inventions. Indeed, the novel embodiments described herein may be embodied in a variety of other forms. Furthermore, various omissions, substitutions and changes in the form of embodiments described herein may be made without departing from the spirit of the inventions. The accompanying claims and there equivalents are intended to cover such forms or modifications as would fall within the scope and spirit of the invention.

What is claimed is:

1. An information generating device which generates data for use in a sheet print processor capable of printing in a state where a plurality of sheets are connected to each other, the information generating device comprising:
   a memory configured to store predetermined image data;
   an input device configured to receive sheet information relating to the plurality of sheets which are to be connected to each other by a sheet print processor; and
   a controller configured to
      set a magnification ratio indicating either an enlargement ratio or a reduction ratio of the image data, based on a length of a sheet in a second direction orthogonal to a first direction in which the plurality of sheets which are specified by the sheet information are to be connected, and
      determine a connection length indicating a length of a connection region which is formed between the plurality of sheets in the first direction, based on the set magnification ratio and lengths of the plurality of sheets in the first direction.

2. The device according to claim 1,
wherein the controller is configured to determine the connection length, based on a first length in the first direction when the image data is converted according to the magnification ratio, and a second length which is a total length of the plurality of sheets in the first direction.

3. The device according to claim 2,
wherein three or more sheets are to be connected to each other by the sheet print processor, and
the controller is configured to equally divide a difference between the first length and the second length or a length obtained by subtracting a length of a margin region from the difference into a plurality of connection regions, and determine each connection length of the plurality of connection regions.

4. The device according to claim 2,
wherein three or more sheets are connected to each other by the sheet print processor, and
the controller is configured to unevenly divide a difference between the first length and the second length or a length obtained by subtracting a length of a margin region from the difference into a plurality of connection regions, and determine each connection length of the plurality of connection regions.

5. The device according to claim 1,
wherein three or more sheets are connected to each other by the sheet print processor, and
the controller is configured to determine the connection length of at least one of a plurality of connection regions to be a length different from connection lengths of other connection regions.

6. The device according to claim 4,
wherein the controller is configured to receive an input from the input device of each connection length of the plurality of connection regions,
the information generating device further includes a display device configured to display the image data and the connection regions, based on each connection length received from the input device.

7. The device according to claim 2,
wherein the controller is configured to determine, as a number of the plurality of sheets to be connected by the sheet print processor, a minimum number of the sheets which provide a length in the first direction exceeding the first length when the sheets are connected according to a predetermined connection length.

8. The device according to claim 7,
wherein the controller is configured to determine an integer value larger than the minimum number of the sheets as the number of the plurality of sheets to be connected.

9. The device according to claim 1,
wherein the plurality of sheets include sheets of a plurality of sizes having same lengths in the second direction and having different lengths in the first direction.

10. A print processing device comprising:
the information generating device according to claim 1, wherein the controller is configured to form an image on each sheet, based on generation image data generated by the information generating device; and
a sheet binding mechanism configured to bind the plurality of sheets on which the image is formed.

11. An information generating method of generating data for use in a sheet print processor capable of printing in a state where a plurality of sheets are connected to each other, the information generating method comprising:
receiving sheet information relating to the plurality of sheets which are to be connected to each other by a sheet print processor;
setting a magnification ratio indicating either an enlargement ratio or a reduction ratio of image data, based on a length of the sheet in a second direction orthogonal to a first direction in which the plurality of sheets which are specified by the sheet information are to be connected; and
determining, by a controller, a connection length indicating a length of a connection region which is formed between the plurality of sheets in the first direction, based on the set magnification ratio and lengths of the plurality of sheets in the first direction.

12. The method according to claim 11, further comprising:
determining the connection length based on a first length in the first direction when the image data is converted according to the magnification ratio, and a second length which is a total length of the plurality of sheets in the first direction.

13. The method according to claim 12, further comprising:
causing three or more sheets to be connected to each other by the sheet print processor, and
equally dividing, by the controller, a difference between the first length and the second length or a length obtained by subtracting a length of a margin region from the difference into a plurality of connection regions, and determining each connection length of the plurality of connection regions.

14. The method according to claim 12, further comprising:
causing three or more sheets to be connected to each other by the sheet print processor, and
unequally dividing, by the controller, a difference between the first length and the second length or a length obtained by subtracting a length of a margin region from the difference into a plurality of connection regions, and determining each connection length of the plurality of connection regions.

15. The method according to claim 11, further comprising:
causing three or more sheets to be connected to each other by the sheet print processor, and
determining, by the controller, the connection length of at least one of a plurality of connection regions to be a length different from connection lengths of other connection regions.

16. The method according to claim 14, further comprising:
receiving, via an input peripheral, an input of each connection length of the plurality of connection regions, and
displaying image data and the plurality of connection regions, based on each connection length received from the input peripheral.

17. The method according to claim 12, further comprising:
determining, as a number of the plurality of sheets to be connected by the sheet print processor, a minimum number of the sheets which provide a length in the first direction exceeding the first length when the sheets are connected according to a predetermined connection length.

18. The method according to claim 17, further comprising:
- determining an integer value larger than the minimum number of the sheets as the number of the plurality of sheets to be connected.

19. The method according to claim 11,
- wherein the plurality of sheets include sheets of a plurality of sizes having same lengths in the second direction and having different lengths in the first direction.

* * * * *